Patented May 1, 1934

1,956,785

UNITED STATES PATENT OFFICE 1,956,785

PROTEIN FOOD-COLOR AND METHOD OF PRODUCING SAME

Hugh E. Allen, Chicago, Ill., assignor of one-half to Albert G. McCaleb, Evanston, Ill.

No Drawing. Application June 23, 1932, Serial No. 618,945

8 Claims. (Cl. 99—5)

My invention contemplates and provides a protein product suitable for introduction into various foods to tint same and to add thereto a valuable nutriment.

The product of the present invention is a derivative of animal blood, preferably fresh beef blood, and basically owes its tinctorial characteristic to nature's own agent for tinting animal tissues, i. e. the hæmoglobin of blood. In my new product the tinctorial power of natural hæmoglobin is greatly increased in potency and preserved for realization in a great variety of foodstuffs, such for example as ground meat products, rye and whole wheat bread, other bakery goods, pudding bases, etc.

One of the objects of the present invention is to improve the method and product disclosed in my copending patent application, Serial No. 594,964, filed February 24, 1932.

Another object of the present invention is to produce, by the treatment of animal blood, a material for tinting foodstuffs which is entirely or substantially free from blood serum and the fibrous and albuminous constituents of the animal blood from which the coloring material is derived.

Another object of the inventtion is to provide a composition of matter in the form of a dry protein powder, having great tinctorial power, which may constitute an ingredient of a great variety of foods wherein added color and nutriment are desirable.

Other objects, features and advantages of my invention will appear from the following detailed description, in which I have set forth, inter alia, the preferred method of producing my new protein food color.

In preparing the material of my present invention, I utilize animal blood which is so fresh that it has not coagulated to any appreciable extent as a result of its exposure to the air. Beef blood is preferred, but the blood of various other edible animals may be employed, if desired.

The first phase in the treatment of the blood aptly may be termined "defibrination". This part of my process is performed by agitating the blood very violently, preferably by means of a motor driven agitator, for a period of from five to ten minutes. After this period of violent agitation, a stringy fibrous mass (fibrinogen) rises to the top of the blood under treatment, and is skimmed therefrom. The blood is then again violently agitated for a period of from five to ten minutes, is again permitted to remain quiescent, and the stringy fibrous mass which rises to the top of the blood under treatment is again skimmed therefrom. Ordinarily, in the spring and summer, two periods of vibration, two periods of quiescence and two skimmings, as aforesaid, will be found sufficient to effect the removal of all of the stringy fibrous material from the blood under treatment. However, at other times in the year, five or more violent agitations, each followed by a period of quiescence and skimming, may be necessary entirely to remove the stringy fibrous material from the blood under treatment. By virtue of this defibrination, the blood under treatment is thereafter prevented from coagulating even under extremely cold temperatures. Defibrination also facilitates the mechanical separation of the remaining constituents of the blood in the manner next to be described.

The defibrinated blood is next placed in and operated upon by a centrifugal separator to separate (a) the hæmoglobin (i. e. protein plus hæmatin) and a minor portion of the entrained aqueous constituent of the blood, from (b) the blood serum, albuminous matter and the excess aqueous content of the blood under treatment. The aqueous hæmoglobin has greater specific gravity than the aqueous serum and albuminous matter and, as it comes from the centrifugal separator, is dark red in color. The aqueous solution of serum and albuminous matter is light amber in shade. By initially adjusting the separator so that a slight pinkish streak appears in the amber solution of serum and albuminous matter and then readjusting the separator just sufficiently to exclude such pinkish streak, the proper separation of the aqueous hæmoglobin from the serum, albuminous matter and excess aqueous content of the blood is readily obtained.

The aqueous hæmoglobin derived from the blood under treatment by centrifugal separation as just explained, is highly concentrated and possessed of great tinctorial power, which is emphasized and made permanent by the curing phase of my method now to be described.

In the next or curing phase of my method, I make use of a curing agent of which six hundred (600) pounds may be made in accordance with the following formula:

| | Pounds |
|---|---|
| Sodium nitrite (NaNO₂) | 30 |
| Sodium nitrate (NaNO₃) | 10 1/16 |
| Sodium chloride (NaCl) | 559 15/16 |

The above mentioned sodium salts are thoroughly milled together and preferably are reduced to the approximate fineness of free flowing table salt. The relative proportions of these sodium salts may be varied. However, the precise formula above given has been found to be one which affords exceptionally satisfactory results.

I now add approximately one per cent (1%), by weight, of the aforesaid curing agent to the concentrated aqueous hæmoglobin, and violently agitate the mixture, by means of a motor driven agitator, for from three to five minutes. The result of this violent agitation of the aqueous hæmoglobin in the presence of the sodium salts, thoroughly distributed therethrough, is a practically instantaneous chemical reaction between the sodium salts and the hæmoglobin, i. e. the conversion of the aqueous hæmoglobin into aqueous nitroso-hæmoglobin.

The aqueous nitroso-hæmoglobin is now thoroughly dehydrated to reduce it to a dark red powder. While I do not limit myself to any particular means or method for effecting the dehydration of the nitroso-hæmoglobin, I have found that such dehydration is very satisfactorily accomplished by evaporation in a vacuum pan and/or by spraying the aqueous hæmoglobin into a dry heated air stream.

The resultant dry dark red powder will keep indefinitely without any appreciable deterioration, even though it is not excluded from contact with the air. Because of its great tinctorial strength, the nutritive value of its protein content, and its solubility in water and meat juices, it is available and highly desirable for use in coloring food products of many kinds. My new composition of matter, i. e. the dark red protein powder derived from animal blood in the manner hereinbefore explained, finds an important use, as an added ingredient of ground meat condiments of the kind covered by my Letters Patent Nos. 1,781,154, dated November 11, 1930 and 1,829,431, dated October 27, 1931. However, the use of my new composition of matter is in no way limited to ground meat condiments. To the contrary, it is intended for and capable of use for tinting and adding nutrition to a great variety of foodstuffs.

Having thus described my invention, what I claim is new and desire to secure by Letters Patent of the United States is:

1. A dark red stable protein powder suitable for admixture with food products to tint the same, said powder consisting of thoroughly nitroso cured dehydrated animal blood hæmoglobin isolated from its naturally associated fibrinogen, serum and albuminous matter.

2. As an article of manufacture, a material for coloring foodstuffs characterized by great tinctorial strength and consisting of dehydrated nitroso hæmoglobin, substantially free from fibrinogen.

3. As an article of manufacture, a coloring material for coloring foodstuffs in the form of a dry dark red powder consisting only of the isolated, nitroso-cured, and hydrated protein constituent of animal blood, substantially free from fibrinogen.

4. The method of producing a protein food color which consists in removing the fibrinogen from animal blood, centrifuging the blood thus treated to isolate its hæmoglobin from serum, albuminous matter and excess moisture, nitroso-curing the hæmoglobin thus isolated, and finally dehydrating the cured hæmoglobin.

5. The method of producing a protein food color in the form of a dark red powder having great tinctorial strength, said method consisting in removing the fibrinogen from animal blood by agitation, subjecting the blood thus treated to centrifugal separation to isolate its hæmoglobin content from its content of serum, albuminous matter and excess moisture, nitroso-curing the concentrated hæmoglobin and finally dehydrating the same.

6. The herein-described method of producing a protein food color which consists in removing the fibrous matter from animal blood by successive periods of agitation and quiescence, centrifuging the blood thus treated to isolate its hæmoglobin from serum, albuminous matter and excess moisture, and both nitroso-curing and dehydrating the said hæmoglobin.

7. The method of producing a dark red protein food color which consists in removing the fibrinogen from animal blood, subjecting the blood thus treated to centrifugal separation to isolate its hæmoglobin content from the serum and albuminous matter which apepars with the hæmoglobin in nature, violently agitating the isolated hæmoglobin in the presence of salts of the group consisting of sodium nitrite and sodium nitrate admixed therewith to cure the hæmoglobin, and finally dehydrating the cured hæmoglobin.

8. The method of producing from animal blood a dark red protein powder suitable for admixture with food products to color the same and characterized by great tinctorial power, said method consisting in separating the fibrinogen from animal blood by successive periods of agitation and quiescence, followed by skimming of the stringy matter which rises to the top of the blood, in the periods of quiescence following agitation, centrifuging the blood under treatment to separate its hæmoglobin content from the serum, albuminous matter and excess moisture which occurs with the hæmoglobin in nature, violently agitating the isolated hæmoglobin in the presence of salts of the group consisting of sodium nitrite and sodium nitrate rapidly to convert the hæmoglobin into nitroso hæmoglobin, and finally dehydrating said nitroso hæmoglobin.

HUGH R. ALLEN.

CERTIFICATE OF CORRECTION.

Patent No. 1,956,785.  May 1, 1934.

HUGH E. ALLEN.

It is hereby certified that error appears in the printed specification of the above numbered patent requiring correction as follows: Page 1, line 27, for "inventtion" read invention; page 2, line 78, claim 3, for "hydrated" read dehydrated; and line 111, claim 7, for "apepars" read appears; and that the said Letters Patent should be read with these corrections therein that the same may conform to the record of the case in the Patent Office.

Signed and sealed this 19th day of June, A. D. 1934.

Bryan M. Battey (Seal)  Acting Commissioner of Patents.